(12) United States Patent
Ishiba

(10) Patent No.: US 8,590,288 B2
(45) Date of Patent: *Nov. 26, 2013

(54) FAN CONTROL APPARATUS

(75) Inventor: Masatsugu Ishiba, Gotemba (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 1405 days.

This patent is subject to a terminal disclaimer.

(21) Appl. No.: 12/078,213

(22) Filed: Mar. 28, 2008

(65) Prior Publication Data

US 2009/0077946 A1    Mar. 26, 2009

(30) Foreign Application Priority Data

Mar. 30, 2007  (JP) ................................ P2007-092561

(51) Int. Cl.
*F02K 3/00* (2006.01)
*F02K 3/02* (2006.01)
*B64C 29/00* (2006.01)

(52) U.S. Cl.
USPC ............. 60/233; 60/224; 60/226.1; 224/23 A; 224/23 R

(58) Field of Classification Search
USPC ............ 60/200.1, 224, 226.1; 244/12.3, 24 R
See application file for complete search history.

(56) References Cited

U.S. PATENT DOCUMENTS

| | | | |
|---|---|---|---|
| 3,095,165 A | 6/1963 | Rowe | |
| 3,095,696 A * | 7/1963 | Rumble | ........................... 60/770 |
| 3,174,284 A | 3/1965 | McCarthy | |
| 3,381,295 A | 4/1968 | Blackledge | |
| 3,618,875 A | 11/1971 | Kappus | |
| 5,082,079 A | 1/1992 | Lissaman | |
| 6,260,796 B1 | 7/2001 | Klingensmith | |
| 6,834,495 B2 * | 12/2004 | Saito et al. | ...................... 60/224 |

(Continued)

FOREIGN PATENT DOCUMENTS

| | | |
|---|---|---|
| JP | 8-59124 | 3/1996 |
| JP | 11-255199 A | 9/1999 |

(Continued)

OTHER PUBLICATIONS

S. Iwase et al., Unsteady Flow inside the Single Rotor Blade Row with Multistage Tip Turbine (2nd Report: Effects of bulkheads positioning on efficiency), *J. Gs Turbine Soc. Jap.*, vol. 34, No. 2, (Mar. 2006), pp. 118-123.

(Continued)

*Primary Examiner* — Ehud Gartenberg
*Assistant Examiner* — Arun Goyal
(74) *Attorney, Agent, or Firm* — Finnegan, Henderson, Farabow, Garrett & Dunner, LLP

(57) ABSTRACT

A fan control apparatus includes a fan, two engine+compressor combinations, two air supply systems, and an FCC. When an abnormality occurs in one of the air supply systems and one of the engine+compressor combinations, the FCC maintains the flow rate of the normally operating air supply system and then increases the flow rate. As a result, the normally operating drive source is prevented from overloading. In another embodiment, a fan control apparatus includes a fan, an air source, two air supply systems, and a bypass channel. The air is caused to flow through the bypass channel when an abnormality occurs in one of the air supply systems. As a result, the time that elapses till the fluid can be supplied at a necessary flow rate is shortened.

2 Claims, 12 Drawing Sheets

(56) References Cited

U.S. PATENT DOCUMENTS

| | | | |
|---|---|---|---|
| 6,837,038 B2 * | 1/2005 | Eiler et al. | 60/226.1 |
| 7,188,803 B2 | 3/2007 | Ishiba | |
| 7,599,767 B2 * | 10/2009 | Fukuda | 701/4 |
| 8,038,091 B2 | 10/2011 | Ishiba | |
| 2007/0018034 A1 * | 1/2007 | Dickau | 244/12.3 |

FOREIGN PATENT DOCUMENTS

| | | |
|---|---|---|
| JP | 2000-213666 | 8/2000 |
| JP | 2005-125976 | 5/2005 |
| JP | 2006-213168 | 8/2006 |
| JP | 2007-22268 | 2/2007 |
| JP | 2007-55372 | 3/2007 |
| JP | 2007-125976 A | 5/2007 |

OTHER PUBLICATIONS

S. Iwase, et al., "The Fan Driven by High Pressure Tip Turbine," *J. Gas Turbine Soc. Jap.*, vol. 33, No. 1 (Jan. 2005), pp. 44-51.

Office Action issued in U.S. Appl. No. 12/078,305, mailed Mar. 17, 2011. (7 pages).

Amendment submitted in U.S. Appl. No. 12/078,305, on Jul. 18, 2011 (8 pages).

Notice of Allowance and Notice of Allowability issued in U.S. Appl. No. 12/078,305, mailed Aug. 3, 2011. (4 pages).

Machine translation of JP 2007-022268 A, published Feb. 1, 2007.

* cited by examiner

Fig.4
(a)
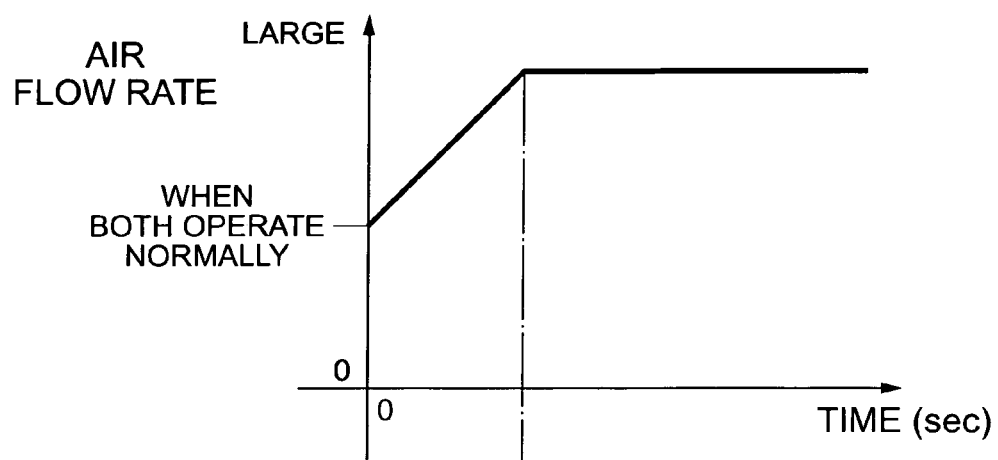
(b)
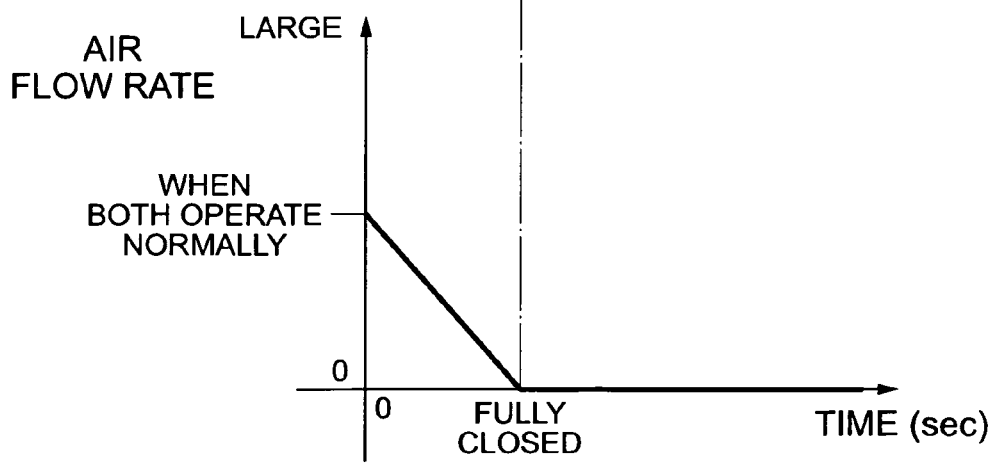

*Fig.5*
(a)
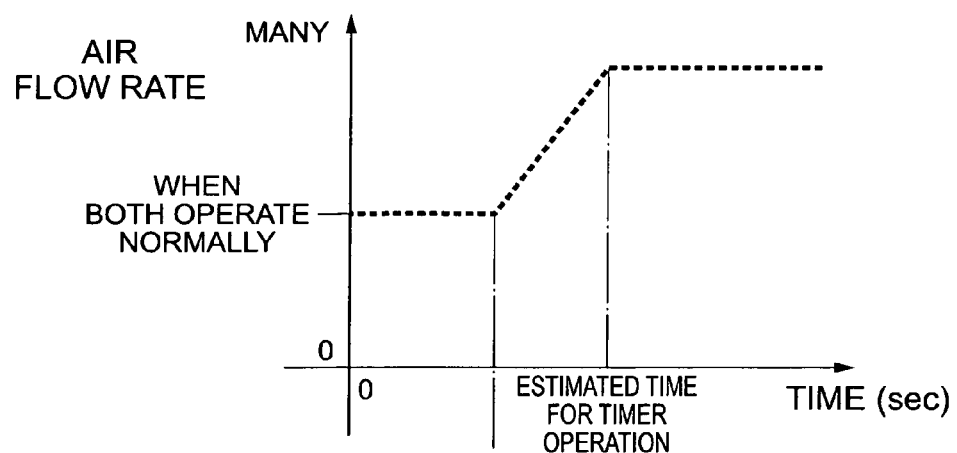
(b)
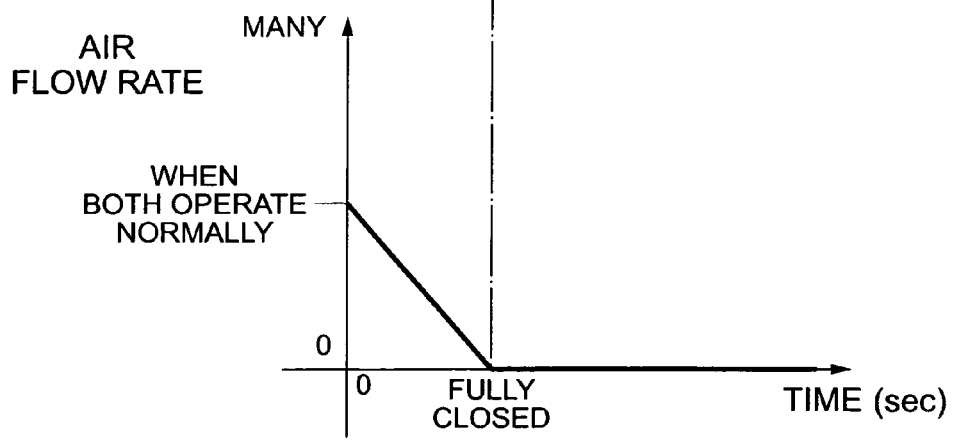

Fig.10
(a)
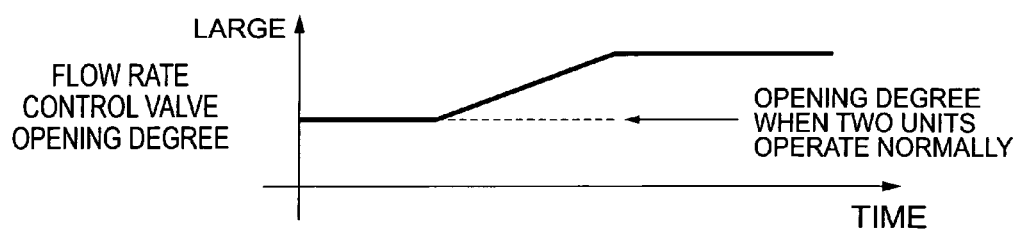
(b)
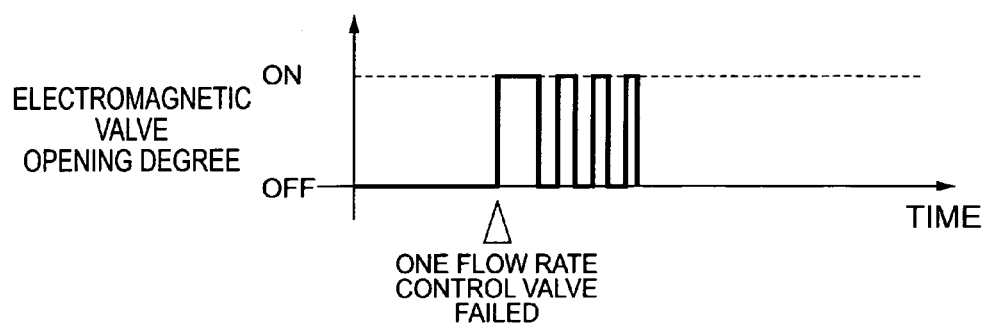

FAN CONTROL APPARATUS

BACKGROUND OF THE INVENTION

1. Field of the Invention

The present invention relates to a fan control apparatus, and more particularly to a fan control apparatus that controls a fan that is rotary driven by being supplied with a fluid and serves to generate a propulsion force of a flying object.

2. Related Background Art

A propulsion force for causing a VTOL (Vertical Take-off and Landing) apparatus to fly has conventionally been obtained by supplying the air by an bleed gas turbine engine and rotary driving a fan. For example, Japanese Patent Application Laid-open No. 2007-22268 discloses a VTOL apparatus comprising two gas turbine engines and two air bleed channels and the apparatus flies by driving a fan with compressed air discharged from the air bleed channel.

However, in such a VTOL apparatus having two engines and two air bleed systems, an abnormality sometimes occurs in one air bleed system or one of the engines sometimes fails and the so-called OEI (One Engine Inoperative) state is assumed. In the case of such OEI, the revolution speed of the normally operating engine and the turbine inlet temperature are increased over those of the rated output to compensate the insufficient fan drive power. However, immediately after one engine fails, the revolution speed of the normally operating engine is low. As a result, when the required output abruptly increases, a surge or the like occurs, the engine is overloaded, and there is a risk that even the engine that has not failed will not be able to operate normally.

Further, when an abnormality occurs, as described above, in one air bleed system, the required amount of air has to be compensated by the normally operating system, but where the required amount of air is compensated by the normally operating system alone, a certain time is needed to enable the supply of a necessary amount of air. Therefore, such an approach is not suitable for flying objects that require a short response time, such as VTOL apparatuses.

SUMMARY OF THE INVENTION

With the foregoing in view, it is an object of the present invention to provide a fan control apparatus such that when an abnormality occurs in some of a plurality of fluid paths and an abnormality also occurs in some of a plurality of drive units, the normally operating drive sources will be prevented from being overloaded.

It is another object of the present invention to provide a fan control apparatus such that when an abnormality occurs in some of a plurality of fluid paths, the time required to enable the supply of a fluid at the necessary flow rate can be shortened.

The present invention provides a fan control apparatus comprising: a fan that is rotary driven by being supplied with a fluid and generates a propulsion force of a flying object; two or more fluid supply systems having two or more fluid supply units that supply the fluid for driving the fan, and two or more fluid paths which connect the fluid supply units to the fan and through which the fluid can flow; and a control unit that controls a flow rate of the fluid flowing in each of the fluid paths, wherein the control unit maintains the flow rate in the normally functioning fluid supply system and then increases the flow rate when any of the fluid supply systems does not function normally.

With such configuration, the control unit maintains the flow rate in the normally functioning fluid supply system and then increases the flow rate when any of the fluid supply systems does not function normally. Therefore, the normally operating drive source can be prevented from overloading.

Further, the present invention provides a fan control apparatus comprising: a fan that is rotary driven by being supplied with a fluid and generates a propulsion force of a flying object; two or more fluid supply units that supply the fluid for driving the fan; a fluid collection unit that collects the fluid supplied from the two or more fluid supply units; two or more fluid paths that connect the fluid collection units to the fan and through which the fluid can flow; and a control unit that controls a flow rate of the fluid flowing in each of the fluid paths, wherein the control unit maintains the flow rate in the normally functioning fluid path and then increases the flow rate when any of the fluid paths does not function normally and any of the fluid supply units does not function normally.

With such configuration, the fluid supplied from two or more fluid supply units is collected in the fluid collection unit, and then the fluid collected in the fluid collection unit is caused to flow through two or more fluid paths. By providing such fluid collection unit it is possible to increase safety at the time of failure with respect to that of the configuration in which the fluid is directly supplied from the fluid supply units to the fan.

It is preferred that after the fluid supply unit that functions normally has assumed a state in which the fluid can be supplied at the increased flow rate, the control unit increases the flow rate of the fluid path that functions normally.

With such configuration, after the fluid supply unit that functions normally has assumed a state in which the fluid can be supplied at the increased flow rate, the control unit increases the flow rate of the fluid path that functions normally. Therefore, the normally operating drive source can be reliably prevented from overloading.

Further, the present invention provides a fan control apparatus comprising: a fan that is rotary driven by being supplied with a fluid and generates a propulsion force of a flying object; a fluid supply unit that supplies the fluid for driving the fan; two or more fluid paths which connect the fluid supply unit to the fan and through which the fluid can flow; and a bypass channel that connects the fan to the fluid supply unit and through which the fluid can flow, wherein the fluid is caused to flow through the bypass channel when any of the fluid paths does not function normally.

With such configuration, the fluid is caused to flow through the bypass channel when any of the fluid paths does not function normally. Therefore, the flow rate of the fluid that can be supplied to the fan per unit time can be increased, the time that elapses before the fluid at a necessary flow rate can be supplied can be shortened, instantaneous insufficiency of flow rate can be avoided, and the response delay can be further improved.

In this case, the fluid is preferably caused to flow through the bypass channel until a state is assumed in which the flow path that functions normally can supply the fluid at the necessary flow rate to the fan.

With such configuration, the fluid is caused to flow until a state is assumed in which the flow path that functions normally can supply the fluid at the necessary flow rate to the fan. Therefore, the time that elapses before the fluid at the necessary flow rate can be supplied can be shortened, instantaneous insufficiency of flow rate can be avoided, and the response delay can be further improved.

Further, it is preferred that the bypass channel be closed, so that no fluid flows therethrough, when all the fluid paths function normally.

With such configuration, when all the fluid paths function normally, the fluid can be supplied to the fan with a small loss via the fluid paths that are usually used. Further, when any of the fluid paths does not function normally, the fluid is caused to flow through the bypass channel. Therefore, the time that elapses before the fluid at a necessary flow rate can be supplied can be shortened, instantaneous insufficiency of flow rate can be avoided, and the response delay can be further improved.

With the fan control apparatus in accordance with the present invention, a normally operating drive source can be prevented from being overloaded. Further, with the fan control apparatus in accordance with the present invention, the time that elapses before the fluid at a necessary flow rate can be supplied can be shortened, instantaneous insufficiency of flow rate can be avoided, and the response delay can be improved.

BRIEF DESCRIPTION OF THE DRAWINGS

FIG. 4 is a graph illustrating the variation of air flow rate in the flow rate control valve at the time both engines operate normally. (a) of FIG. 4 shows the air flow rate in the flow rate control valve on the side that operates normally. (b) of FIG. 4 shows the air flow rate in the flow rate control valve on the side where failure has occurred;

FIG. 5 is a graph illustrating the variation of air flow rate in the flow rate control valve at the time of OEI transition. (a) shows the air flow rate in the flow rate control valve on the side that operates normally. (b) shows the air flow rate in the flow rate control valve on the side where failure has occurred;

FIG. 10 is a graph illustrating the variation of the opening degree of the valve when a flow rate control valve on one side fails. (a) shows the opening degree of the flow rate control valve on the side that operates normally. (b) shows the opening degree of the electromagnetic valve;

DESCRIPTION OF THE PREFERRED EMBODIMENTS

A propulsion fan control apparatus of an embodiment of the present invention will be described below with reference to the appended drawings.

Figure 1:
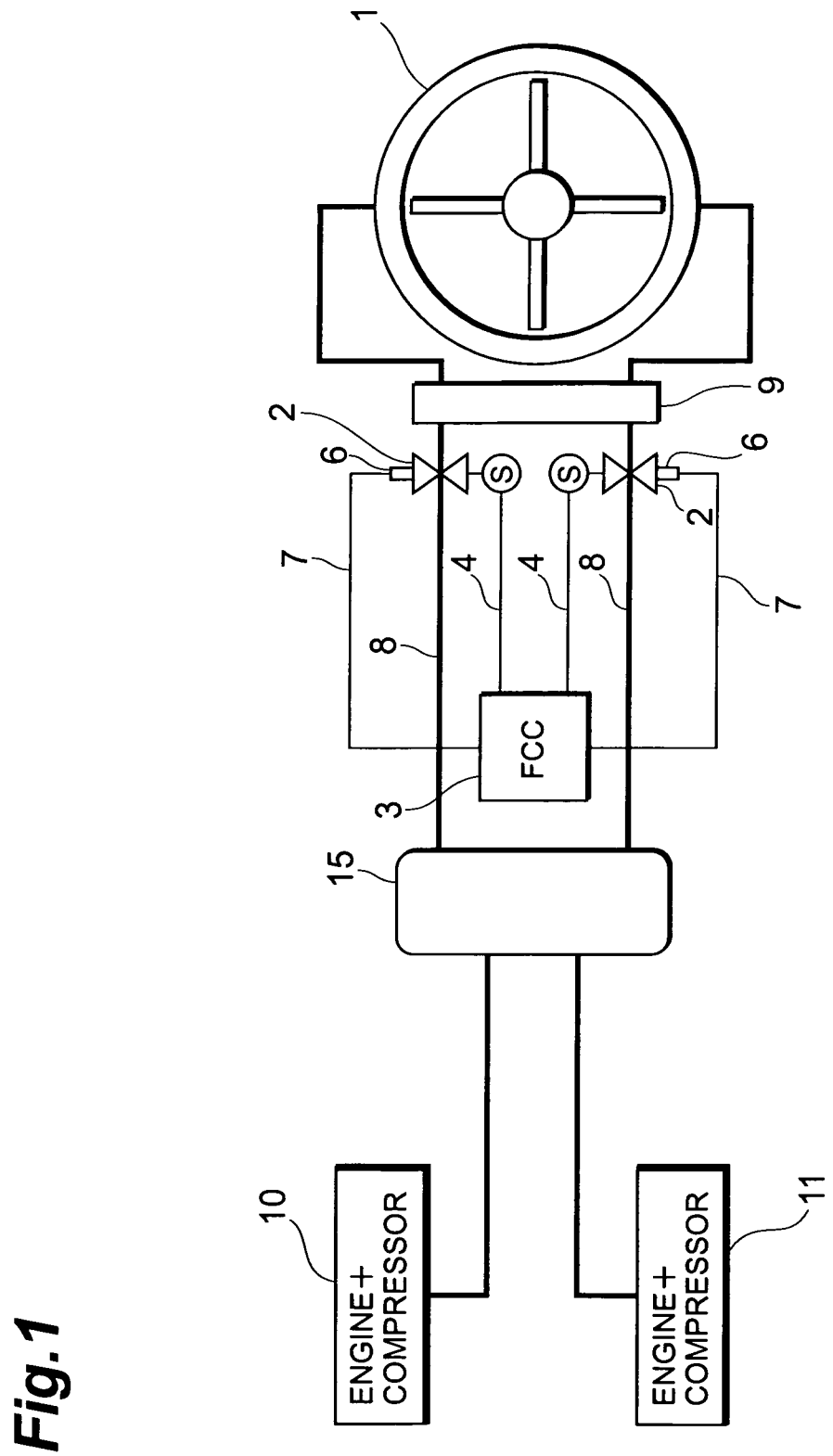
FIG. 1 illustrates the configuration of a propulsion fan control apparatus of the first embodiment.

FIG. 1 illustrates the configuration of a propulsion fan control apparatus of the first embodiment. As shown in FIG. 1, the propulsion fan control apparatus of the present embodiment serves to control the operation of a fan that generates a propulsion force of a VTOL apparatus and comprises a fan 1, flow rate control valves 2, an FCC 3, opening degree sensors 6, air supply systems 8, a collector pipe 9, and engine+compressor combinations 10, 11, and an air tank 15.

The engine+compressor combinations 10, 11 serve to supply the compressed air as a drive source to the fan 1 and are composed of an air source bleed gas turbine engine and a compressor. A reciprocal engine, a rotary engine, or an electric motor also can be employed as a power source for driving the compressor. The engine+compressor combinations 10, 11 function as fluid supply units set forth in the claims. The state of the engine+compressor combinations 10, 11 is detected by a FADEC (Full Authority Digital engine Control apparatus) that is not shown in the figures.

The air tank 15 serves to collect the compressed air supplied from the engine+compressor combinations 10, 11. The air tank 15 functions as a fluid collection unit set forth in the claims.

Two air supply systems 8 serve to supply the compressed air from the air tank 15 to the fan 1. The air supply systems 8 function as fluid paths set forth in the claims. A flow rate control valve 2 is provided in each of the air supply systems 8. The two air supply systems 8 are connected to the collector pipe 9 from the outlets of the flow rate control valves 2. The outlet of the collector pipe 9 is connected by a pipe to the fan 1.

Each flow rate control valve 2 has a capacity that is adapted for the case in which an abnormality occurs in one air supply system 8 and the necessary amount of air is supplied to the fan 1 by only one system. The flow rate control valves 2 may use an electric drive or a hydraulic drive. The flow rate control valves 2 are connected to the FCC (Flight Control Computer) 3 by a communication means such as an electric cable and is controlled by a valve opening degree control signal 4 from the FCC 3.

An opening degree sensor 6 that detects the opening degree of the valve is connected to each flow rate control valve 2. The opening degree sensor 6 is connected to the FCC 3 by a communication means such as an electric cable, and an opening degree sensor signal 7 of the opening degree sensor 6 is sent to the FCC 3. A signal indicating the state parameters of the engine+compressor combinations 10, 11 from the FADEC is also inputted to the FCC 3. The FCC 3 serves to control the flight of the VTOL apparatus and functions as a control unit set forth in the claims.

Figure 2:
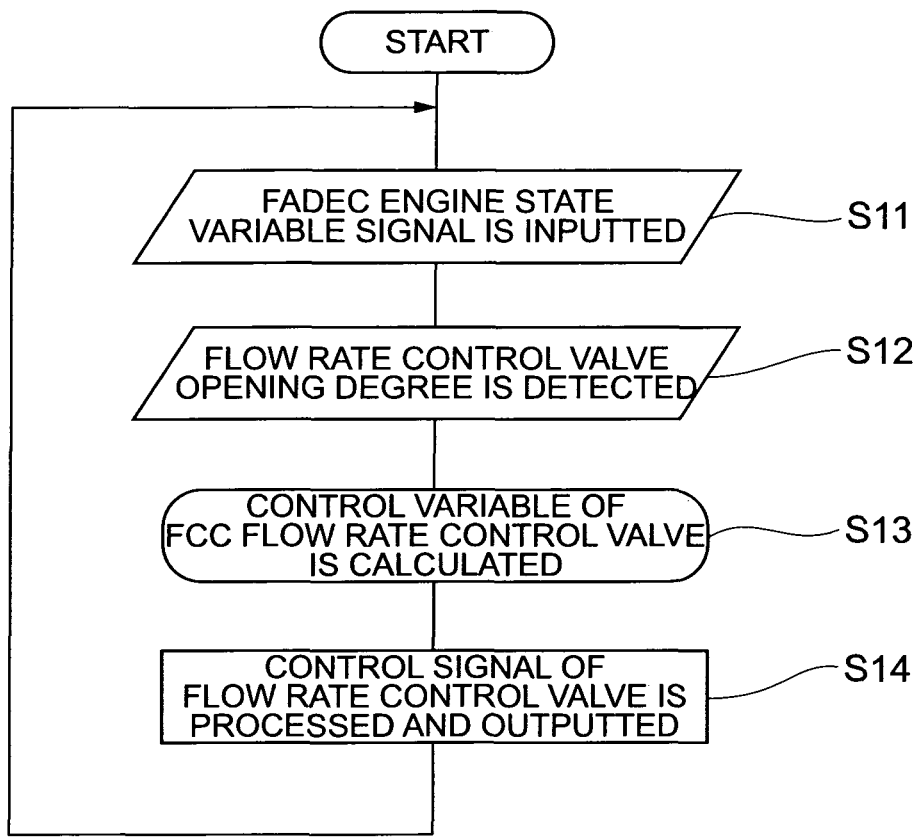
FIG. 2 is a flowchart illustrating the operation of the propulsion fan control apparatus of the first embodiment.

The operation of the propulsion fan control device of the present embodiment will be described below. FIG. 2 is a flowchart illustrating the operation of the propulsion fan control apparatus of the first embodiment. As shown in FIG. 2, where a propulsion control routine is started in the flight of the VTOL apparatus, a signal indicating the state variables of the engine+compressor combinations 10, 11 is inputted from the FADEC to the FCC 3 (S11). The opening degree sensors 6 detect the opening degree of each flow rate control valve 2 (S12). The FCC calculates the control variable of each flow rate control valve 2 based on the opening degree detected by the opening degree sensors 6 (S13). The FCC 3 outputs a valve opening degree control signal 4 to each flow rate control valve 2 so as to reach the calculated control variable (S14).

Figure 3:
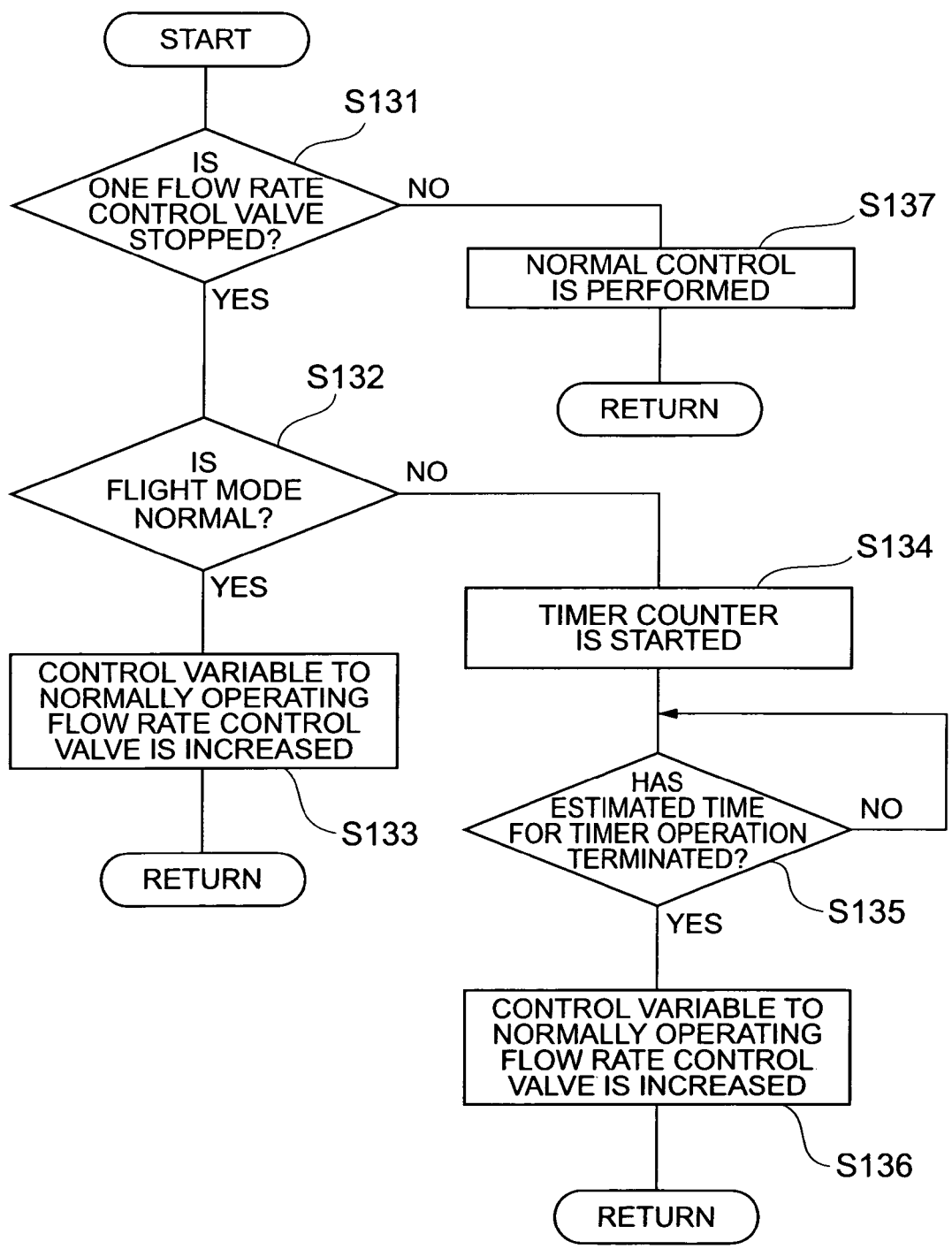
FIG. 3 is a flowchart illustrating the control variable calculation for a flow rate control valve of the FFC of the first embodiment.

The operations performed when the FCC 3 calculates the control variable of flow rate control valves 2 in the present embodiment will be described below. FIG. 3 is a flowchart illustrating the control variable calculation for a flow rate control valve 2 of the FCC 3 of the first embodiment. As shown in FIG. 3, where the FCC 3 detects that one flow rate control valve 2 has been stopped by a signal from the opening degree sensor 6 (S131) and where the FLIGHT mode is normal, that is, both engine+compressor combinations 10, 11 operate normally (S132), the FCC 3 increases the control variable (valve opening degree) for the flow rate control valve 2 that operates normally so as to increase the air flow rate in this flow rate control valve 2, as shown in (a) of FIG. 4, with the object of compensating the decrease in the air flow rate in the flow rate control valve 2 that has failed, as shown in (b) of FIG. 4 (S133).

On the other hand, where the FCC 3 detects that one flow rate control valve 2 has been stopped by a signal from the opening degree sensor 6 (S131) and where the FLIGHT mode is not normal, that is, one engine+compressor combination 10, 11 is in the abnormal OEI state (S132), the timer counter located in the FCC 3 is started (S134).

Before the timer counter reaches the end estimation time at which a state is assumed in which the normally functioning combination from among the engine+compressor combinations 10, 11 can supply the air at the increased flow rate, the FCC 3 maintains the control variable (valve opening degree) for the normally operating flow rate control valve 2 in order to maintain the air flow rate in the flow rate control valve 2 on the normal operation side, as shown in (a) of FIG. 5, even if the air flow rate of the flow rate control valve 2 on the failure side decreases, as shown in (b) of FIG. 5 (S135). Where the timer counter reaches the end estimation time (S135), the control variable (valve opening degree) for the normally operating flow rate control valve 2 is increased to increase the air flow rate in the flow rate control valve 2 on the normal operation side, as shown in (a) of FIG. 5, in order to cancel the decrease the air flow rate in the flow rate control valve 2 on the failed side, as shown in (b) of FIG. 5 (S136).

When the FCC 3 does not detect that one flow rate control valve 2 has stopped by the signal from the opening degree sensor 6 (S131), the FCC 3 performs the usual control (S137).

In the present embodiment, when any of the flow rate control valves 2 of the air supply paths 8 does not function normally and any of the engine+compressor combinations 10, 11 does not function normally, the FCC 3 maintains and then increases the flow rate in the air supply path 8 that has been functioning normally. As a result, the normally operating combination from among the engine+compressor combinations 10, 11 can be prevented from overloading and the adverse effect thereon can be prevented.

Where the flow rate control valve 2 on one side fails and the air cannot be supplied from the air supply system or the amount of air that can be supplied decreases, there is a risk that the drive power of the fan 1 will greatly decrease. Therefore, the opening degree of the normally operating flow rate control valve 2 on the other side has to be increased. Further, where one of the engine+compressor combinations 10, 11 fails, the revolution speed and turbine inlet temperature of the normally operating combination from among the engine+compressor combinations 10, 11 has to be increased over those at the rated output, and the amount of air that can be supplied from the normally operating combination from among the engine+compressor combinations 10, 11 has to be increased.

Here, when one flow rate control valve 2 and one combination from among the engine+compressor combinations 10, 11 fail, if the flow rate in the normally operating air supply system is increased before a state is assumed in which the normally operating combination from among the engine+compressor combinations 10, 11 can supply the necessary amount of air, the amount of bled air will increase, whereby the amount of air that flows into the combustion chamber and acts upon the turbine will decrease. As a result, the acceleration margin of the engine will disappear and an overload can occur in the normally operating engine.

In the present embodiment, the compressed air supplied from the engine+compressor combinations 10, 11 is collected in the air tank 15, and even when an abnormality occurs in the air supply system, a period in which the flow rate attained prior to the abnormality is provided, the flow rate for engine acceleration, that is, the amount of fluid flowing into the combustion chamber is ensured and then a flow rate control is performed to compensate the necessary fan propulsion power. As a result, the normally operating engine can be prevented from being overloaded.

In particular, in the present embodiment, the FCC 3 increases the flow rate in the normally functioning air supply path 8 after a state has been assumed in which the normally functioning combination from among the engine+compressor combinations 10, 11 can supply the air at the increased flow rate. Therefore, the normally functioning combination from among the engine+compressor combinations 10, 11 can be reliably prevented from overloading.

Figure 6:
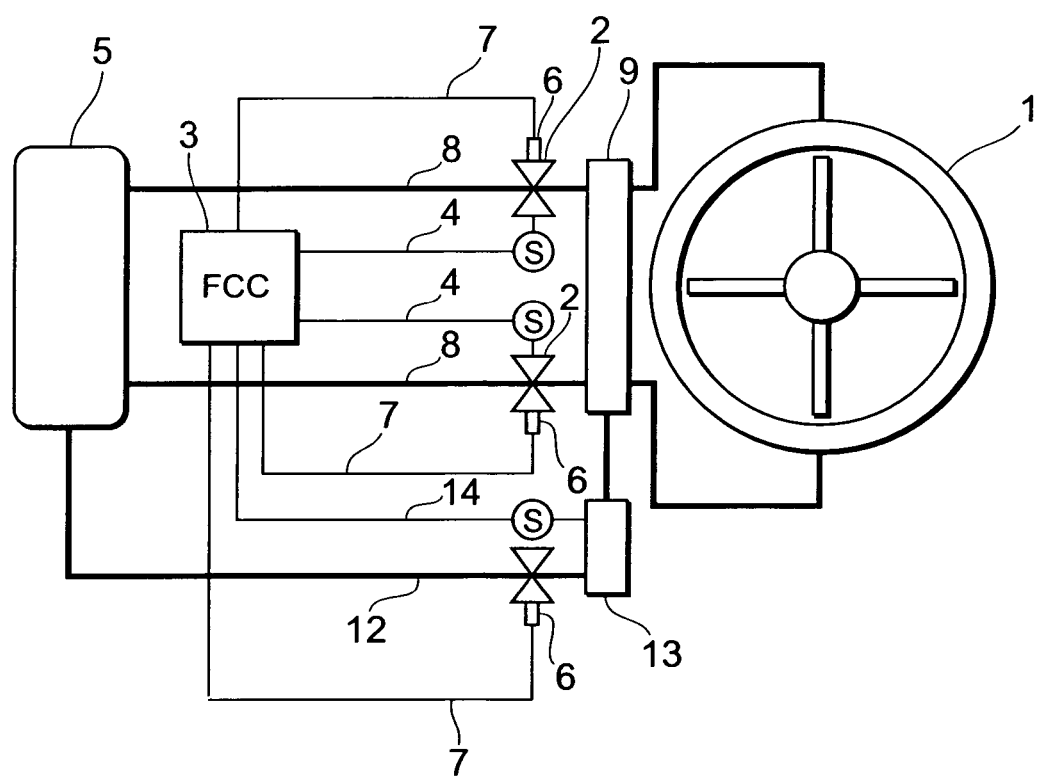
FIG. 6 illustrates the configuration of a propulsion fan control apparatus of the second embodiment.

The second embodiment of the present invention will be described below. FIG. 6 illustrates the configuration of a propulsion fan control apparatus of the second embodiment. As shown in FIG. 6, the propulsion fan control apparatus of the present embodiment serves to control the operation of a fan that generates a propulsion force of a VTOL apparatus and comprises a fan 1, flow rate control valves 2, an FCC 3, an air source 5, opening degree sensors 6, air supply systems 8, a collector pipe 9, a bypass channel 12, and an electromagnetic valve 13.

The air source 5 serves to supply the compressed air as a drive source to the fan 1 and is composed of an air source bleed gas turbine engine and a compressor. A reciprocal engine, a rotary engine, or an electric motor also can be employed as a power source for driving the compressor. The air source 5 functions as a fluid supply unit set forth in the claims.

Figure 7:
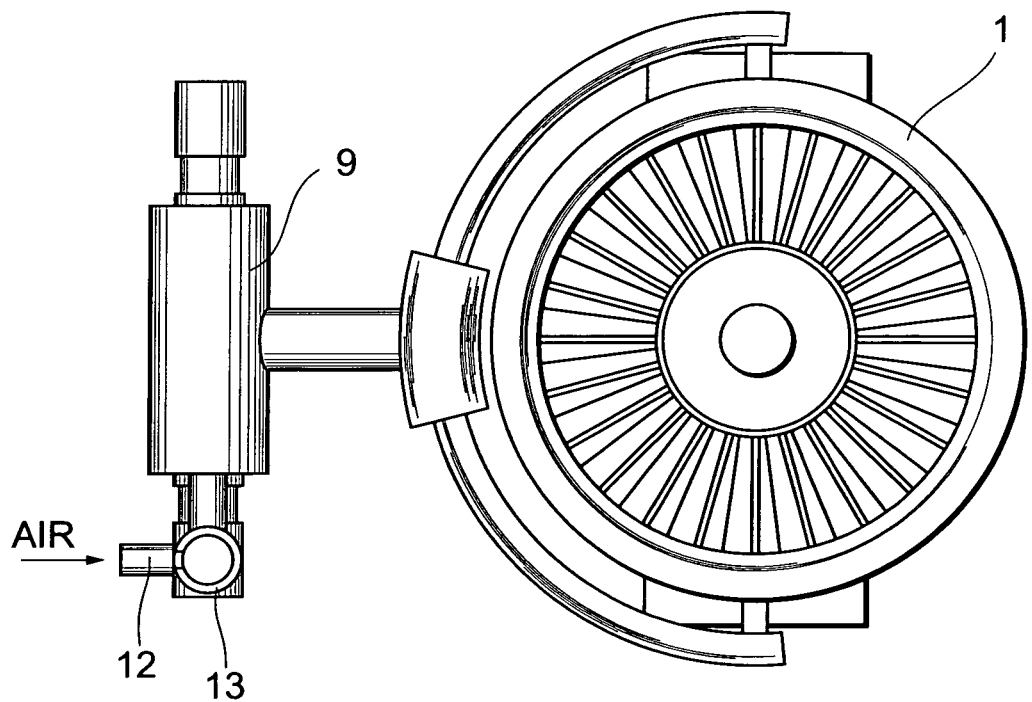
FIG. 7 is a plan view of the propulsion fan of the second embodiment.
Figure 8:
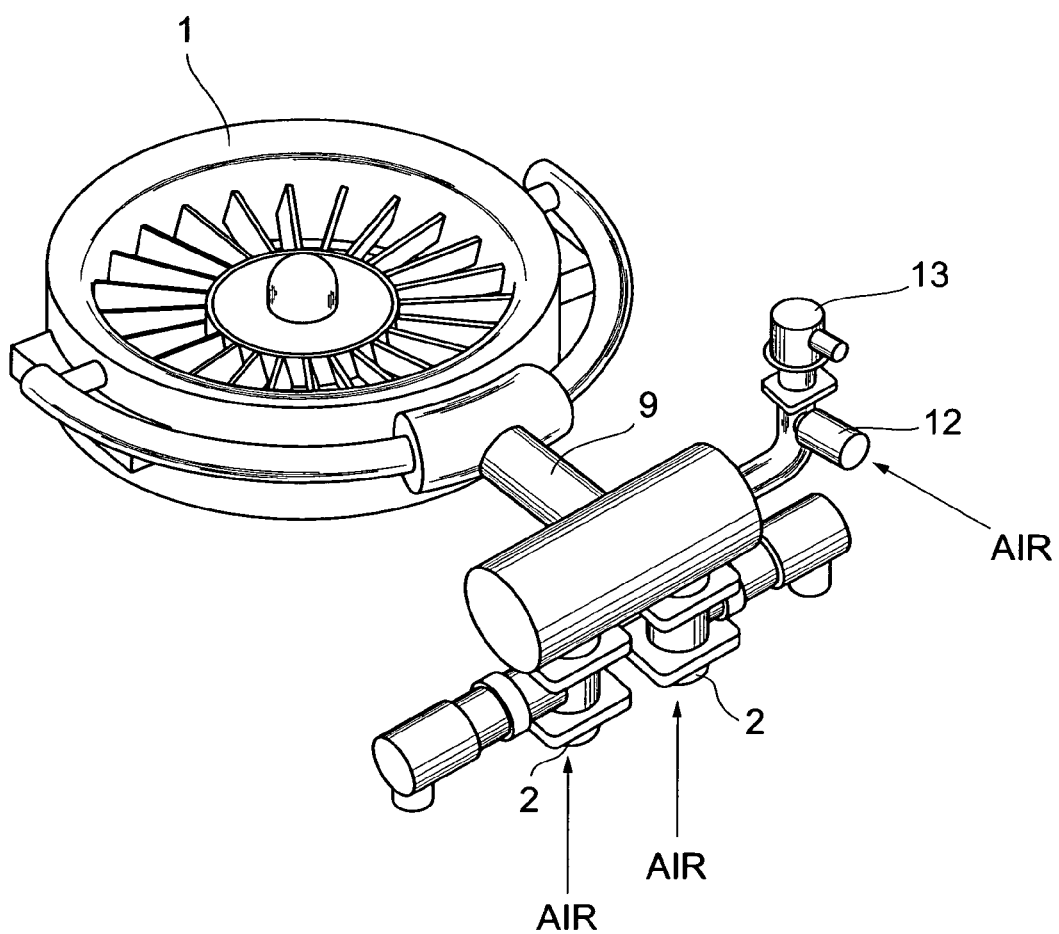
FIG. 8 is a perspective view of the propulsion fan of the second embodiment.

Two air supply systems 8 serve to supply the compressed air from the air source 5 to the fan 1. The air supply systems 8 function as the fluid paths set forth in the claims. As shown in FIG. 7 and FIG. 8, a flow rate control valve 2 is provided in each of the air supply systems 8. The two air supply systems 8 are connected to the collector pipe 9 from the outlets of the flow rate control valves 2. The outlet of the collector pipe 9 is connected by a pipe to the fan 1.

Each flow rate control valve 2 is a cut-off valve or a throttle valve with a small loss and has a capacity that is adapted for the case in which an abnormality occurs in one air supply system 8 and the necessary amount of air is supplied to the fan 1 by only one system. The flow rate control valves 2 may use an electric drive or a hydraulic drive. The flow rate control valves 2 are connected to the FCC (Flight Control Computer) 3 by a communication means such as an electric cable and is controlled by a valve opening degree control signal 4 from the FCC 3.

An opening degree sensor 6 that detects the opening degree of the valve is connected to each flow rate control valve 2. The opening degree sensor 6 is connected to the FCC 3 by a communication means such as an electric cable, and an opening degree sensor signal 7 of the opening degree sensor 6 is sent to the FCC 3.

As shown in FIG. 1, FIG. 7 and FIG. 8, the propulsion fan control apparatus of the present embodiment comprises a bypass channel 12. The bypass channel 12 serves to supply the compressed air from the air source 5 to the fan 1 when an abnormality occurs in one of the air supply systems 8. The electromagnetic valve 13 is provided in the bypass channel 12. The electromagnetic valve 13 has a function of closing or opening the bypass channel 12 by ON/OFF of an electromagnetic valve opening degree control signal 14, and the bypass channel is closed during normal operation. The bypass channel 12 is connected to the collector pipe 9 from the outlet of the electromagnetic valve 13. The electromagnetic valve 13 is connected to the FCC 3 by a communication means such as an electric cable and controlled by the electromagnetic valve opening degree control signal 14 from the FCC 3. An opening degree sensor 6 for detecting the valve opening degree is connected to the electromagnetic valve 13. The opening degree sensor 6 is connected to the FCC 3 by a communication means such as an electric cable, and an opening degree sensor signal 7 of the opening degree sensor 6 is sent to the FCC 3.

Figure 9:
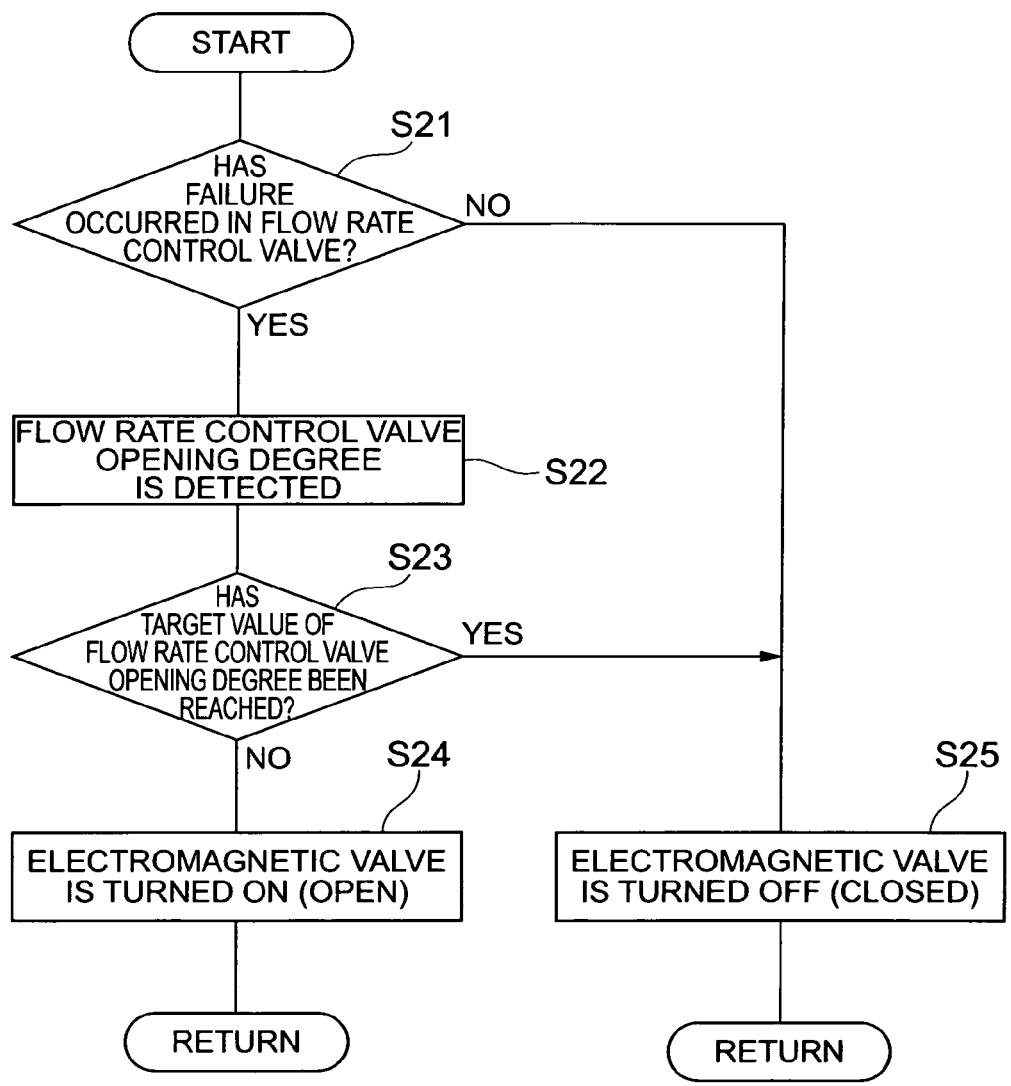
FIG. 9 is a flowchart illustrating the operation of the propulsion fan control apparatus of the second embodiment.

The operation of the propulsion fan control device of the present embodiment will be described below. FIG. 9 is a flowchart illustrating the operation of the propulsion fan control apparatus of the second embodiment. As shown in FIG. 9, where the FCC 3 detects that one of the flow rate control valves 2 has stopped based on the opening degree sensor signal 7 from the opening degree sensor 6, the FCC 3 increases, so that the air is supplied to the fan 1 at the necessary flow rate, the control variable (valve opening degree) for the flow rate control valve 2 on the normally operating side in order to increase the flow rate of the air in the flow rate control valve 2, as shown in (a) of FIG. 10, while detecting the opening degree of the flow rate control valve 2 on the normally operating side with the opening degree sensor 6 (S21).

Where the valve opening degree of the flow rate control valve 2 on the normally operating side has not reached the target opening degree (S23), as shown in (b) of FIG. 10, the FCC 3 sends ON and OFF electromagnetic valve opening degree control signals 14, opens the electromagnetic valve 13, and causes the compressed air to flow also in the bypass channel 12 (S24). When the valve opening degree of the flow rate control valve 2 on the normally operating side reaches the target opening degree (S23), the FCC 3 closes the electromagnetic valve 13 and closes the bypass channel 12 (S25).

In the present embodiment, the compressed air is caused to flow through the bypass channel 12 when any of the flow rate control valves 2 of the air supply channel 8 does not function normally. Therefore, the flow rate of the air that can be supplied to the fan 1 within the unit time can be increased, the time required to reach the state in which the air can be supplied at a necessary flow rate can be shortened, the instantaneous flow rate deficiency is eliminated, and the response delay can be improved.

Figure 11:
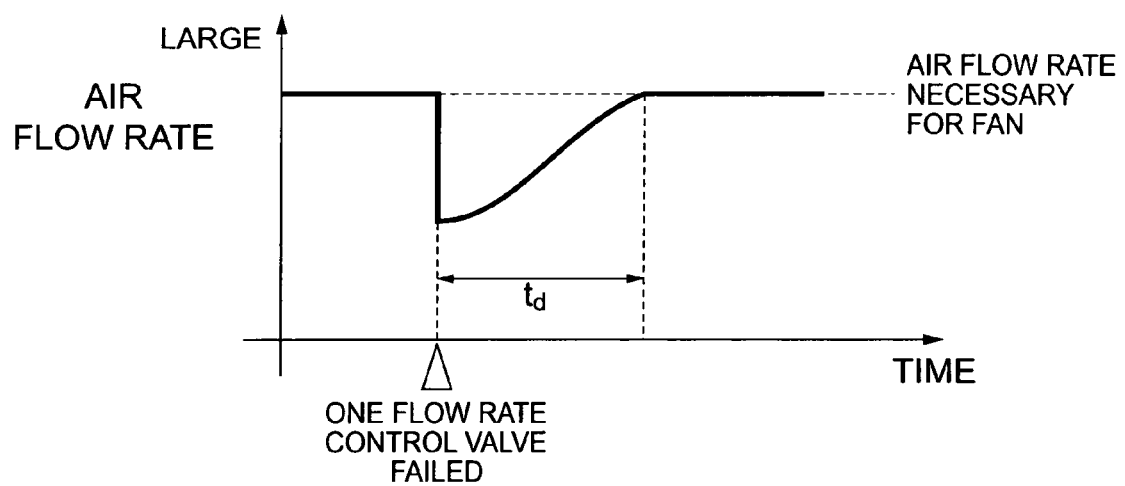
FIG. 11 is a graph illustrating the variation of flow rate of the air supplied to the propulsion fan in the conventional propulsion fan control apparatus.
Figure 12:
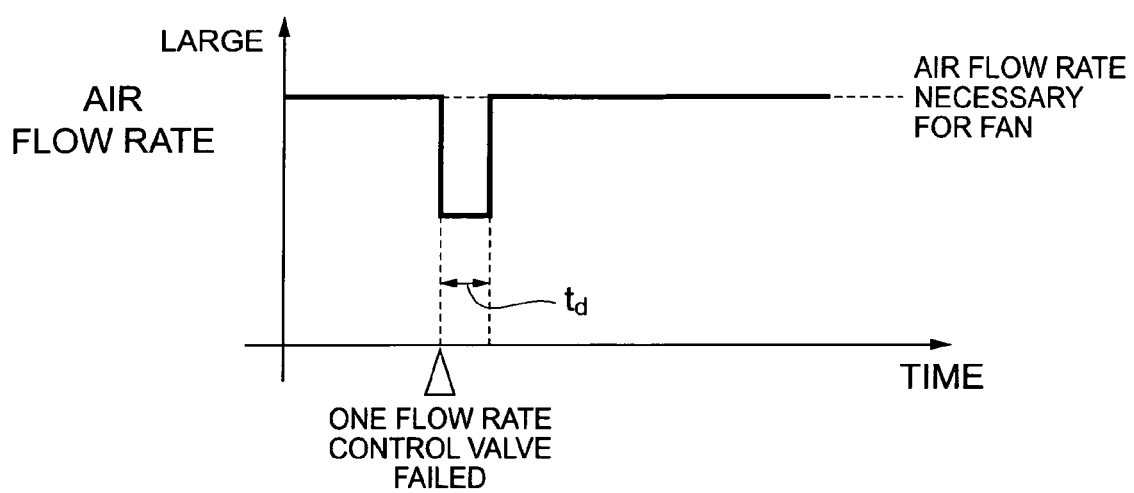
FIG. 12 is a graph illustrating the variation of flow rate of the air supplied to the propulsion fan of the second embodiment.

Thus, as shown in FIG. 11, because the flow rate control valve 2 composed of a typical cut-off valve or throttle valve has a low loss level, but poor responsiveness, when a flow rate control valve 2 on one side fails, the time td that elapses before the flow rate control valve 2 is opened to the necessary opening degree and the air can be supplied at a flow rate necessary for the fan 1 only through one air supply path 8 becomes long and the response delay increases. On the other hand, in the present embodiment, because the bypass channel 12 is opened with the electromagnetic valve 13, which excels in responsiveness, as shown in FIG. 12, the time td that elapses before the air can be supplied at a flow rate necessary for the fan 1 only through one air supply path 8 can be shortened and the response delay can be decreased.

Further, in the present embodiment, the time that elapses before the air can be supplied at a necessary flow rate can be shortened, and because the air is caused to flow until a state is assumed in which the normally functioning air supply path 8 can supply the air at a flow rate necessary for the fan 1, the instantaneous flow rate deficiency is eliminated, and the response delay can be improved.

In addition, in the present embodiment, when both air supply paths 8 function normally, the compressed air can be supplied to the fan 1 with a low loss by two or more air supply channels. Further, when any of the air supply channels does not function normally, the air is caused to flow through the bypass channel 12. As a result, the time that elapses before the air can be supplied at the necessary flow rate can be shortened, the instantaneous flow rate deficiency is eliminated, and the response delay can be improved.

The embodiments of the present invention are explained above, but the present invention is not limited to the embodiments and can be changed in a variety of ways.

What is claimed is:

1. A fan control apparatus comprising:
a fan that is rotary driven by being supplied with a fluid and generates a propulsion force of a flying object;
two or more fluid supply systems having two or more fluid supply units that supply the fluid for driving the fan, and two or more fluid paths which connect the fluid supply units to the fan and through which the fluid can flow, each of the two or more fluid supply units including an engine having a compressor; and
a control unit that controls a flow rate of the fluid flowing in each of the fluid paths, wherein
the control unit maintains the flow rate in a normally functioning fluid supply system and then increases the flow rate when any of the fluid supply systems does not function normally;
wherein in the normally functioning fluid supply system, a control valve of each fluid path and each fluid supply unit is capable of supplying the fluid at a necessary flow rate to the fan;
wherein when the control unit detects that a control valve of a fluid path of the two or more fluid paths has been stopped and where each of the two or more fluid supply units has not failed, the control unit increases the flow rate of the fluid path that functions normally; and
wherein when the control unit detects that a control valve of a fluid path of the two or more fluid paths has been stopped and where one fluid supply unit of the two or more fluid supply units has failed, and after the fluid supply unit that functions normally has assumed a state in which the fluid can be supplied at the increased flow rate, the control unit increases the flow rate of the fluid path that functions normally.

2. A fan control apparatus comprising:
a fan that is rotary driven by being supplied with a fluid and generates a propulsion force of a flying object;
two or more fluid supply units that supply the fluid for driving the fan, each of the two or more fluid supply units including an engine having a compressor;
a fluid collection unit that collects the fluid supplied from the two or more fluid supply units;
two or more fluid paths which connect the fluid collection unit to the fan and through which the fluid can flow; and
a control unit that controls a flow rate of the fluid flowing in each of the fluid paths, wherein
the control unit maintains the flow rate in a normally functioning fluid path and then increases the flow rate when any of the fluid paths does not function normally a any of the fluid supply units does not function normally;
wherein in the normally functioning fluid path, a control valve and a respective one of the fluid supply units is capable of supplying the fluid at a necessary flow rate to the fan;

wherein when the control unit detects that a control valve of a fluid path of the two or more fluid paths has been stopped and where each of the two or more fluid supply units has not failed, the control unit increases the flow rate of the fluid path that functions normally; and wherein when the control unit detects that a control valve of a fluid path of the two or more fluid paths has been stopped and where one fluid supply unit of the two or more fluid supply units has failed, and after the fluid supply unit that functions normally has assumed a state in which the fluid can be supplied at the increased flow rate, the control unit increases the flow rate of the fluid path that functions normally.

\* \* \* \* \*